US011236272B2

(12) United States Patent
Lee et al.

(10) Patent No.: US 11,236,272 B2
(45) Date of Patent: Feb. 1, 2022

(54) MULTI-TUBE PYROLYSIS SYSTEM FOR WASTE PLASTIC

(71) Applicants: Yung-Teng Lee, New Taipei (TW); I-Pin Huang, Taipei (TW)

(72) Inventors: Peng-Yang Lee, Chang Hua County (TW); I-Pin Huang, Taipei (TW)

(73) Assignees: Yung-Teng Lee, New Taipei (TW); I-Pin Huang, Taipei (TW)

( * ) Notice: Subject to any disclaimer, the term of this patent is extended or adjusted under 35 U.S.C. 154(b) by 119 days.

(21) Appl. No.: 16/551,119

(22) Filed: Aug. 26, 2019

(65) Prior Publication Data

US 2021/0032544 A1 Feb. 4, 2021

(30) Foreign Application Priority Data

Aug. 1, 2019 (TW) .................................. 108127666

(51) Int. Cl.
| | |
|---|---|
| *C08J 11/12* | (2006.01) |
| *C10B 47/44* | (2006.01) |
| *C10B 53/07* | (2006.01) |
| *B29B 17/02* | (2006.01) |
| *B29B 17/04* | (2006.01) |
| *C10B 47/16* | (2006.01) |
| *B01J 6/00* | (2006.01) |
| *B29B 17/00* | (2006.01) |

(52) U.S. Cl.
CPC .............. *C10B 53/07* (2013.01); *B01J 6/008* (2013.01); *C08J 11/12* (2013.01); *C10B 47/16* (2013.01); *C10B 47/44* (2013.01); *B29B 2017/001* (2013.01); *B29B 2017/0203* (2013.01); *B29B 2017/0296* (2013.01); *B29B 2017/0496* (2013.01); *Y02P 20/143* (2015.11); *Y02W 30/62* (2015.05)

(58) Field of Classification Search
None
See application file for complete search history.

(56) References Cited

U.S. PATENT DOCUMENTS

| 6,126,907 | A | * | 10/2000 | Wada | ........................ | C10B 7/10 |
| | | | | | | 110/246 |
| 2007/0187224 | A1 | * | 8/2007 | Yoshimura | ................ | F23G 7/12 |
| | | | | | | 202/118 |
| 2011/0107668 | A1 | * | 5/2011 | Wu | .......................... | C10G 1/10 |
| | | | | | | 48/61 |

FOREIGN PATENT DOCUMENTS

EP 0025319 A1 * 3/1981 ............. C10B 53/02

* cited by examiner

*Primary Examiner* — Jennifer A Leung
(74) *Attorney, Agent, or Firm* — Alan D. Kamrath; Karin L. Williams; Mayer & Williams PC

(57) ABSTRACT

A multi-tube pyrolysis system for waste plastic contains: a preparation system, a decomposition system, and a filtration system. The preparation system includes a collection module, a selection module, a crushing module, and a plastic extrusion module. The decomposition system includes a reaction furnace, a primary combustion chamber assembly, a secondary combustion chamber assembly, a cooling module, an oil storage tank, and a carbon storage tank. The reaction furnace includes multiple first delivery tubes, and the carbon storage tank has a water filtering module. The filtration system includes a heat exchanger, a rapid cooling device, and a cyclone separation module.

8 Claims, 5 Drawing Sheets

MULTI-TUBE PYROLYSIS SYSTEM FOR WASTE PLASTIC

FIELD OF THE INVENTION

The present invention relates to a multi-tube pyrolysis system for waste plastic which is capable of finishing pyrolysis process after feeding waste plastic successively.

BACKGROUND OF THE INVENTION

A conventional pyrolysis method for waste plastic has to feed waste plastic in batch, and the waste plastic is decomposed slowly. For example, it takes more than 10 hours to decompose the waste plastic.

In addition, the decomposed oil is decomposed from the waste plastic in a small quantity and high labor cost. It is necessary to decompose the waste plastic by ways of additional energy.

The present invention has arisen to mitigate and/or obviate the afore-described disadvantages.

SUMMARY OF THE INVENTION

The primary aspect of the present invention is to provide a multi-tube pyrolysis system for waste plastic which is capable of recycling waste plastic to serve as a fuel of heat source and acquiring recyclable resources (such as decomposed oil and syngas), and the multi-tube pyrolysis system contains a cooling module and a filtration module so as to filter nitrogen oxides ($NO_x$) and sulfur oxides ($SO_x$) from smoked gases produced after thermal degradation of the waste plastic, thus eliminating particles of the smoked gases.

Another aspect of the present invention is to provide a multi-tube pyrolysis system for waste plastic which is capable of decomposing the waste plastic after feeding the waste plastic successively so as to produce heat source, thus saving labor cost, obtaining mass production, and reducing fabrication cost.

To obtain the above aspects, a multi-tube pyrolysis system for waste plastic contains: a preparation system, a decomposition system, and a filtration system.

The preparation system includes a collection module, a selection module, a crushing module, and a plastic extrusion module. The collection module guides waste plastic to the selection module after collecting the waste plastic, the selection module separates out non-plastic substances from the waste plastic, and the waste plastic is crushed by a crushing module, an output tube of the plastic extrusion module heats and melts the waste plastic, then the plastic extrusion module delivers the waste plastic which is melt to a decomposition system.

The decomposition system includes a reaction furnace, a primary combustion chamber assembly, a secondary combustion chamber assembly, a cooling module, an oil storage tank, and a carbon storage tank. The reaction furnace includes multiple first delivery tubes defined therein and configured to heat the waste plastic which is melt, when the waste plastic which is melt is located inside the multiple first delivery tubes, the multiple first delivery tubes have no oxygen so as to heat and decompose the waste plastic which is melt, thus producing decomposed carbon and oil-gas mixed liquid in the reaction furnace; the decomposed carbon is delivered to the carbon storage tank by a second delivery tube; and the carbon storage tank has a water filtering module for separating the decomposed carbon from air; the oil-gas mixed liquid flows through the cooling module to produce decomposed oil and syngas, the decomposed oil is delivered to the oil storage tank, and the syngas enters into the primary combustion chamber assembly to be burn so as to provide heat to the reaction furnace, and the reaction furnace produces smoked gases which are delivered into the secondary combustion chamber assembly; and The filtration system includes a heat exchanger, a rapid cooling device, and a cyclone separation module. A heat source is guided into the heat exchanger from the reaction furnace, and the heat exchanger conducts a high temperature to the secondary combustion chamber assembly; the rapid cooling device is connected with the secondary combustion chamber assembly, and the smoked gases are fed into the cyclone separation module after being eliminated sulfur oxide ($SO_x$), the cyclone separation module produces strong wind in a filtration space so as to conduct the smoked gases to a filter, and the filter filters particles of the smoked gases, then a chimney discharges the particles.

Preferably, each of the multiple first delivery tubes has a spiral rod, each first delivery tube is circular or is oval, the spiral rod has a spiral portion and a cylindrical body which are accommodated in a second delivery tube, and a tangent of the spiral portion is close to a bottom of the second delivery tube, such that the oil-gas mixed liquid is pushed by the spiral portion, and the syngas flows in a channel between a top of the spiral portion and an inner wall of the second delivery tube, thus separating the oil-gas mixed liquid and the syngas.

Preferably, a secondary combustion chamber assembly supplies heat source to the plastic extrusion module so that a temperature of the output tube of the plastic extrusion module is within 250° C. to 300° C. so as to preheat the waste plastic and to eliminate moisture of the waste plastic.

Preferably, the output tube of the plastic extrusion module has an air orifice defined on a middle section thereof so as to discharge water vapor.

Preferably, the reaction furnace is heated to 380° C. to 500° C., and the multiple first delivery tubes are arranged in the reaction furnace and communicate with one another, wherein each of the multiple first delivery tubes has a spiral rod, and a temperature of each first delivery tube in anaerobic state is 380° C. to 500° C.

Preferably, the decomposed carbon in the multiple first delivery tubes is cooled to a room temperature and to contact the air, and distal ends of the multiple first delivery tubes are socked into water respectively so as to avoid the air flowing into the multiple first delivery tubes.

Preferably, the cooling module is controlled less than 36° C. so that the syngas is washed by water or slight lye in a gas buffer tank, and the syngas is fed into the primary combustion chamber assembly to be burn in 1000° C., then a wind feeder delivers a heat of 1000° C. to the reaction furnace, thus heating the multiple first delivery tubes.

Preferably, a temperature of the secondary combustion chamber assembly is more than 850° C., and the smoked gases are maintained in the secondary combustion chamber assembly for at least three seconds so that the smoked gases are burn completely.

Preferably, the smoked gases are guided into a cooler to reduce a temperature of the smoked gases to 200° C., and the smoked gases are sprayed by alkali adding equipment so as to eliminate sulfur oxide ($SO_x$).

DETAILED DESCRIPTION OF THE PREFERRED EMBODIMENTS

With reference to FIGS. 1-7, a multi-tube pyrolysis system for waste plastic according to a preferred embodiment of the present invention comprises: a preparation system 1, a decomposition system 2, and a filtration system 3.

Figure 1:
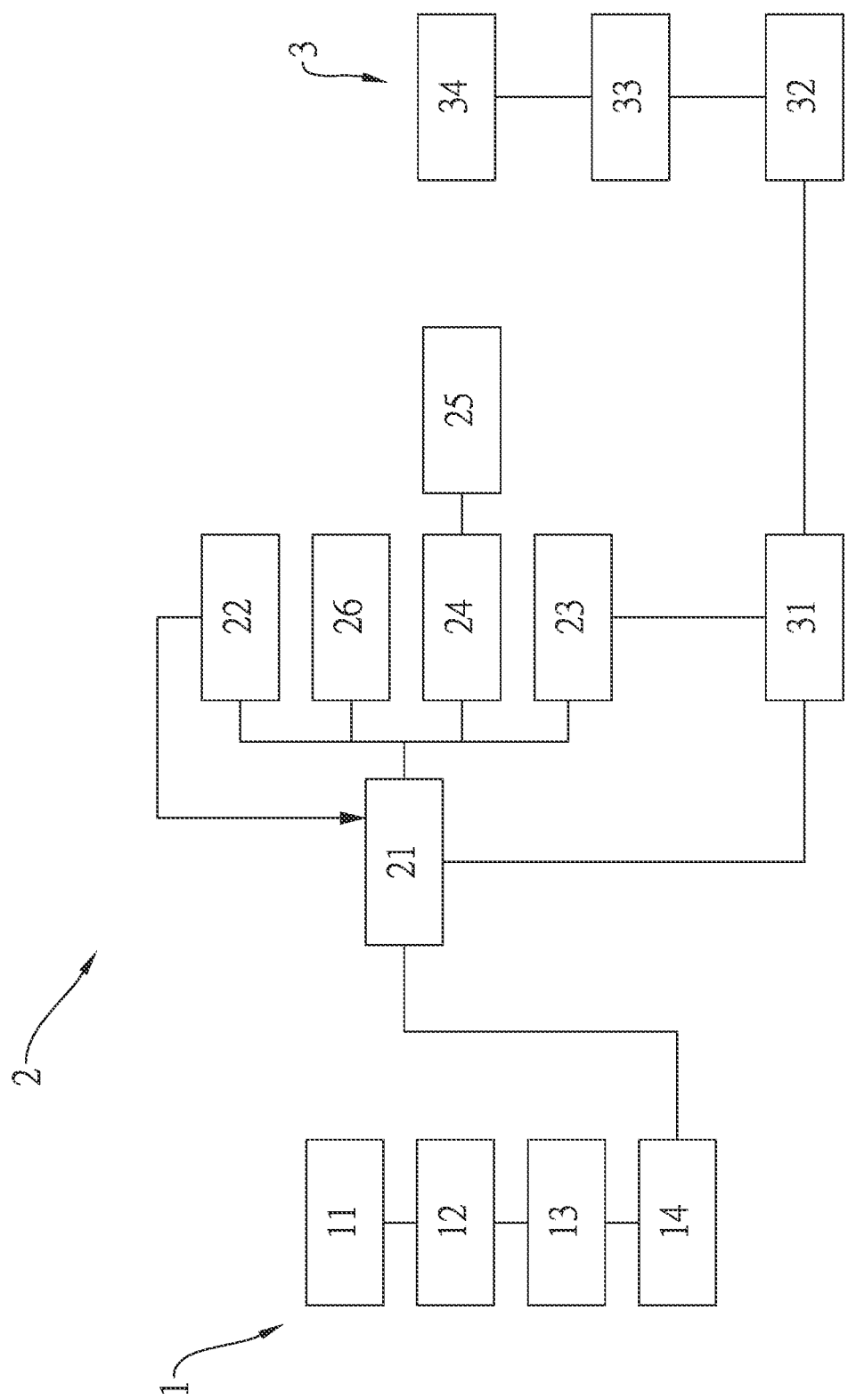
FIG. 1 is a schematic view showing a multi-tube pyrolysis system for waste plastic according to a preferred embodiment of the present invention.

Referring to FIG. 1, the preparation system 1 includes a collection module 11, a selection module 12, a crushing module 13, and a plastic extrusion module 14. The collection module 11 guides waste plastic to the selection module 12 after collecting the waste plastic, wherein the selection module 12 separates out non-plastic substances from the waste plastic in a manual inspection manner, a magnet attraction manner or a mechanical inspection, and the waste plastic is crushed by a crushing module 13, then an output tube of the plastic extrusion module 14 heats and melts the waste plastic, and the plastic extrusion module 14 delivers the waste plastic which is melt to the decomposition system 2.

Figure 2:
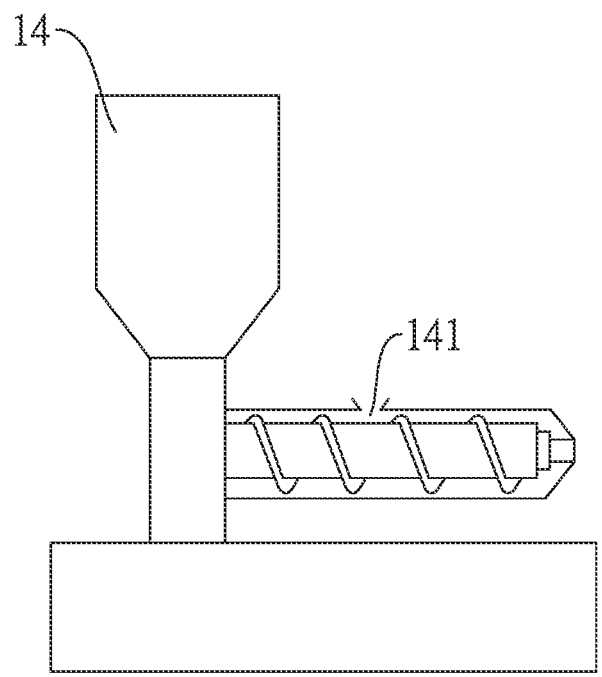
FIG. 2 is a schematic view showing a part of the multi-tube pyrolysis system for the waste plastic according to the preferred embodiment of the present invention.

As shown in FIGS. 1 and 2, a secondary combustion chamber assembly 23 supplies heat source to the plastic extrusion module 14 so that a temperature of the output tube of the plastic extrusion module 14 is within 250° C. to 300° C. so as to preheat the waste plastic and to eliminate moisture (water vapor) of the waste plastic, thus enhancing pyrolysis efficiency. To eliminate the moisture (the water vapor) of the waste plastic, the output tube of the plastic extrusion module 14 has an air orifice 141 defined on a middle section thereof so as to discharge the water vapor. Furthermore, the output tube of the plastic extrusion module 14 further has a protection mechanism which is a valve arranged on a distal end of the output tube of the plastic extrusion module 14 so as to release a pressure.

Figure 3:
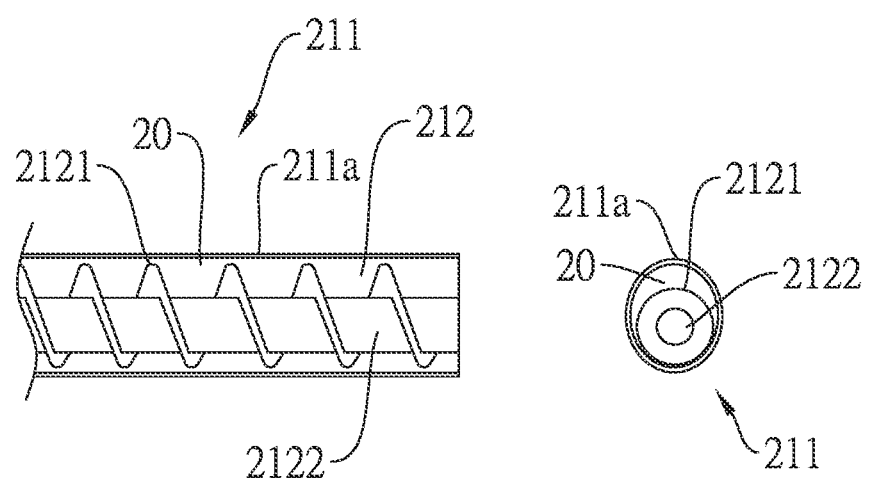
FIG. 3 is another schematic view showing a part of the multi-tube pyrolysis system for the waste plastic according to the preferred embodiment of the present invention.
Figure 4:
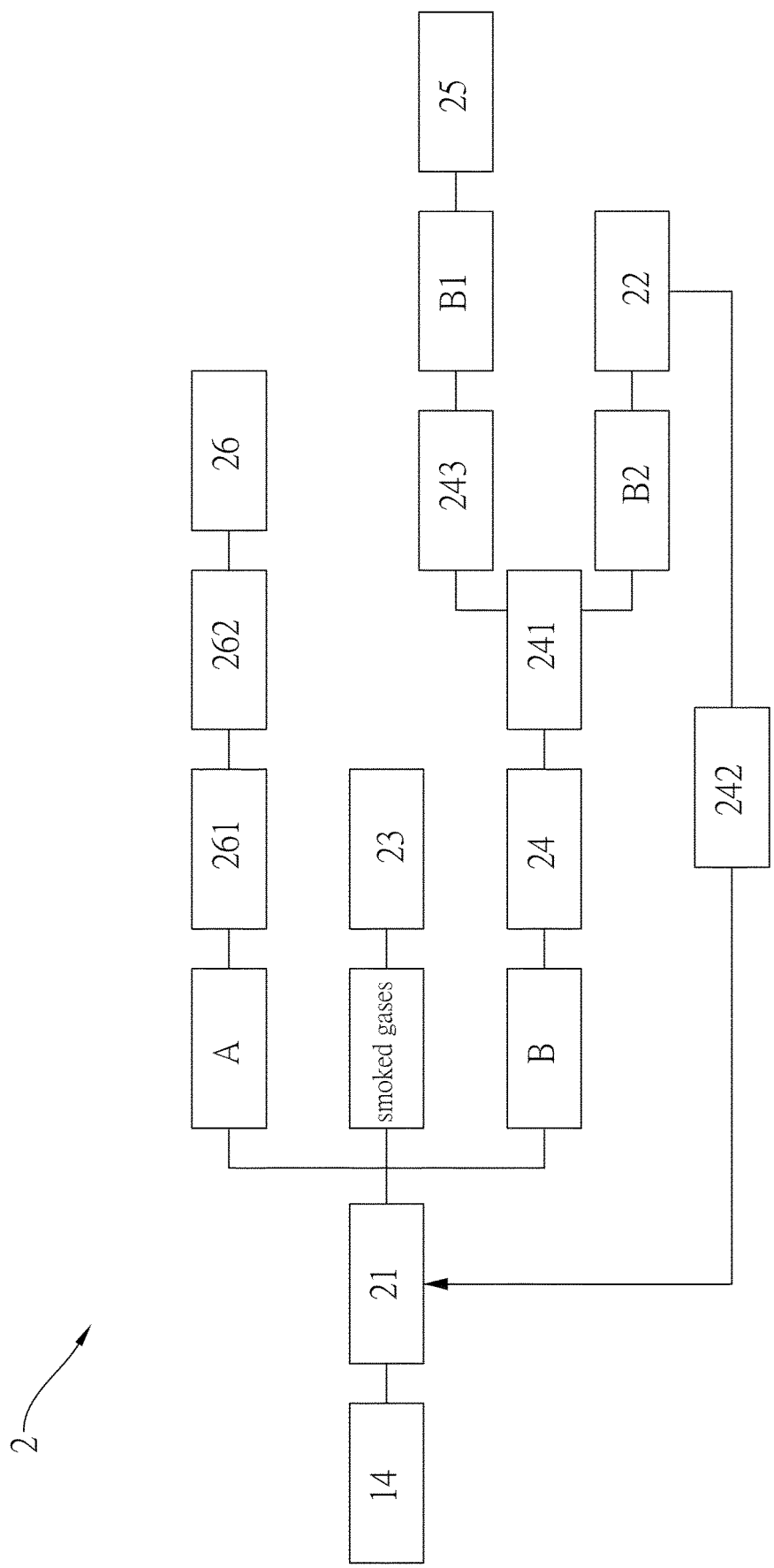
FIG. 4 is also another schematic view showing a part of the multi-tube pyrolysis system for the waste plastic according to the preferred embodiment of the present invention.

As illustrated in FIGS. 1, 3 and 4, the decomposition system 2 includes a reaction furnace 21, a primary combustion chamber assembly 22, the secondary combustion chamber assembly 23, a cooling module 24, an oil storage tank 25, and a carbon storage tank 26. The reaction furnace 21 includes multiple first delivery tubes 211 defined therein and configured to heat the waste plastic which is melt, wherein when the waste plastic which is melt is located inside the multiple first delivery tubes 211, the multiple first delivery tubes 211 have no oxygen so as to heat and decompose the waste plastic which is melt, thus producing decomposed carbon A and oil-gas mixed liquid B in the reaction furnace 21. The decomposed carbon A is delivered to the carbon storage tank 26 by a second delivery tube 261, and the carbon storage tank 26 has a water filtering module 262 for separating the decomposed carbon A from air. The oil-gas mixed liquid B flows through the cooling module 24 to produce decomposed oil B1 and syngas B2, wherein the decomposed oil B1 is delivered to the oil storage tank 25, and the syngas B2 enters into the primary combustion chamber assembly 22 to be burn so as to provide heat to the reaction furnace 21, and the reaction furnace 21 produces smoked gases which are delivered into the secondary combustion chamber assembly 23.

With reference to FIG. 3, the reaction furnace 21 is heated to 380° C. to 500° C., and the multiple first delivery tubes 211 are arranged in the reaction furnace 21 and communicate with one another, wherein each of the multiple first delivery tubes 211 has a spiral rod 212, and a temperature of each first delivery tube 211 in anaerobic state is 380° C. to 500° C., such that the decomposed carbon A in the multiple first delivery tubes 211 is cooled to a room temperature and to contact the air. Thereafter, distal ends of the multiple first delivery tubes 211 are socked into water respectively so as to avoid the air flowing into the multiple first delivery tubes 211.

Referring to FIG. 4, the cooling module 24 is controlled less than 36° C. so that the syngas is washed by the water or slight lye in a gas buffer tank 241, and the syngas is fed into the primary combustion chamber assembly 22 to be burn in 1000° C., then a wind feeder 242 delivers a heat of 1000° C. to the reaction furnace 21, thus heating the multiple first delivery tubes 211.

Figure 5:
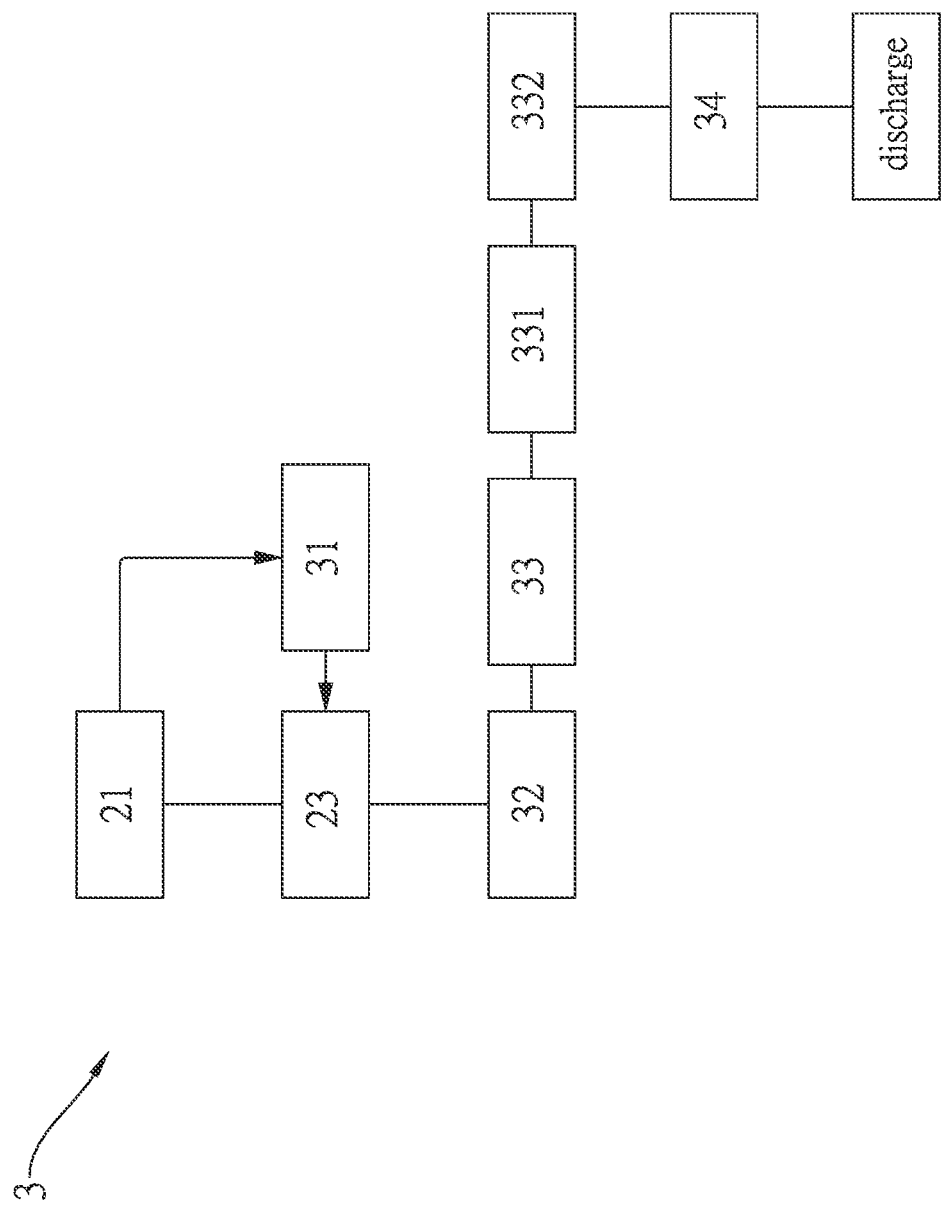
FIG. 5 is still another schematic view showing a part of the multi-tube pyrolysis system for the waste plastic according to the preferred embodiment of the present invention.

As shown in FIGS. 4 and 5, a temperature of the secondary combustion chamber assembly 23 is more than 850° C., and the smoked gases are maintained in the secondary combustion chamber assembly 23 for at least three seconds so that the smoked gases are burn completely to reduce oil and air pollution. The smoked gases are sprayed by urea or ammonia so as to remove nitrogen oxides (i.e., De-NOx) and are guided into a cooler 32 to reduce a temperature of the smoked gases to 200° C., and the smoked gases are sprayed by alkali adding equipment so as to eliminate sulfur oxide ($SO_x$).

Figure 6:
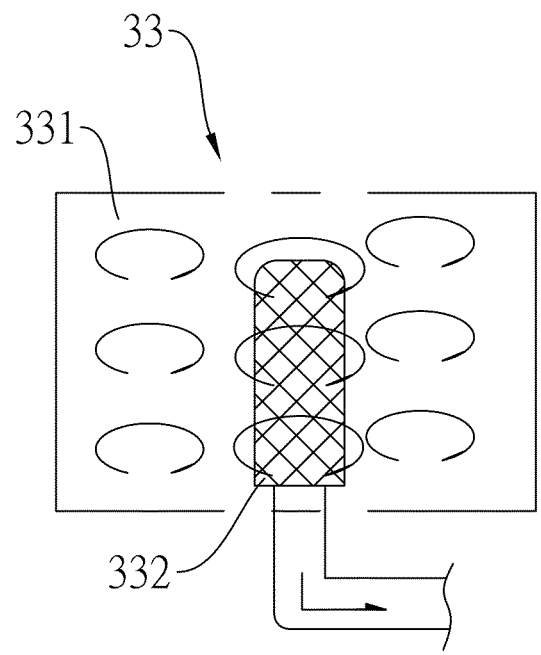
FIG. 6 is another schematic view showing a part of the multi-tube pyrolysis system for the waste plastic according to the preferred embodiment of the present invention.

As illustrated in FIGS. 1, 5 and 6, the filtration system 3 includes a heat exchanger 31, a rapid cooling device 32, and a cyclone separation module 33. The heat source is guided into the heat exchanger 31 from the reaction furnace 21, and the heat exchanger 31 conducts a high temperature to the secondary combustion chamber assembly 23. The rapid cooling device 32 is connected with the secondary combustion chamber assembly 23, and the smoked gases are fed into the cyclone separation module 33 after being eliminated sulfur oxide ($SO_x$). The cyclone separation module 33 produces strong wind in a filtration space 331 so as to conduct the smoked gases to a filter 332, and the filter 332 filters particles of the smoked gases, then a chimney 34 discharges the particles.

With reference to FIGS. 1-7, a method of operating the multi-tube pyrolysis system for the waste plastic comprises steps of:

(S1) heating and melting the waste plastic, wherein the preparation system is configured to pick up the non-plastic substances in any one of the manual inspection manner, the magnet attraction manner, and the mechanical inspection, wherein the waste plastic is crushed by the crushing module 13, aqueous solution is adjusted to a desired proportion by adding barium sulfate, calcium chloride or sodium carbonate so that polyethylene (PE), polypropylene (PP), and polystyrene (PS) float to the aqueous solution, and polyvinyl chloride (PVC) is deposited; the waste plastic is delivered to the plastic extrusion module 14 so as to be heated and melted after being crushed by the crushing module 13, thus drying the waste plastic and enhancing the pyrolysis efficiency.

(S2) decomposing the waste plastic, wherein the waste plastic which is melted is fed into the reaction furnace 21 so as to be heated and decomposed, as shown in FIG. 3, each first delivery tube 211 has the spiral rod 212, and each first delivery tube 211 is circular or is oval. The spiral rod 212 has a spiral portion 2121 and a cylindrical body 2122 which are accommodated in a tube body 211a, and a tangent of the spiral portion 2121 is close to a bottom of the tube body 211a which is oval or circular, such that the oil-gas mixed liquid B is pushed by the spiral portion 2121, and the syngas B2 flows in a channel 20 between a top of the spiral portion 2121 and an inner wall of the tube body 211a, thus separating the oil-gas mixed liquid B and the syngas B2. Preferably, the decomposed carbon A in the multiple first delivery tubes 211 is cooled less than 36 degrees, a check device is configured to avoid the air flowing into an anaerobic inflow tube, and the decomposed carbon A is accommodated in the water so as to avoid being polluted by dust.

Figure 7:
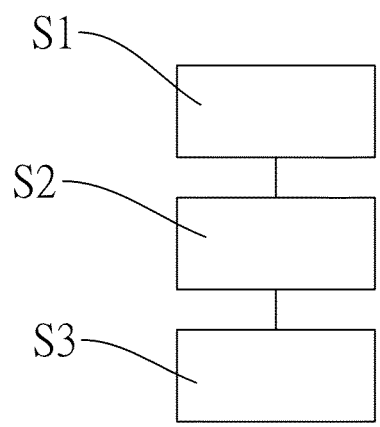
FIG. 7 is a flow chart of a method of operating the multi-tube pyrolysis system for the waste plastic according to the preferred embodiment of the present invention.

Referring to FIGS. 4 and 7, in the step of (S2), the oil-gas mixed liquid B is separated to produce the decomposed oil B1 and the syngas B2. The syngas B2 enters into the primary combustion chamber assembly 22 to be burn and to provide the heat to the reaction furnace 21, and the decomposed oil B1 is recycled and stored in the oil storage tank 25.

As shown in FIG. 4, the cooling module 24 further has a water tower 243 in which cooling water is accommodated so as to cool the decomposed oil B1, thus recycling and using the decomposed oil B1.

As illustrated in FIGS. 1, 4 and 5, a temperature of the secondary combustion chamber assembly 23 is more than 850° C., and the smoked gases stay in the secondary combustion chamber assembly 23 for at least three seconds so as to burn the smoked gases completely, thus reducing the oil and air pollution.

With reference to FIGS. 1, 6 and 7, the method of the present invention further comprises a step of (S3) discharging and filtering, wherein the heat source of the reaction furnace 21 is guided into the heat exchanger 31, and the heat exchanger 31 conducts the high temperature to the secondary combustion chamber assembly 23, thus recycling the heat. The rapid cooling device 32 is connected with the secondary combustion chamber assembly 23, and after spraying reducing agent to the smoked gases so as to eliminate nitrogen oxides from the smoked gases, the smoked gases are fed into the cyclone separation module 33, and the cyclone separation module 33 produces the strong wind in the filtration space 331 so as to conduct the smoked gases to the filter 332, and the filter 332 filters the particles of the smoked gases, then the chimney 34 discharges the particles.

Thereby, the method of operating the multi-tube pyrolysis system is capable of enhancing the pyrolysis efficiency, saving pyrolysis cost, reducing energy consumption, and obtaining environmental protection.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention

What is claimed is:

1. A multi-tube pyrolysis system for waste plastic comprising:

a preparation system including a collection module, a selection module, a crushing module, and a plastic extrusion module; wherein the collection module guides waste plastic to the selection module after collecting the waste plastic, the selection module picks up non-plastic substances from the waste plastic, and the waste plastic is crushed by the crushing module, an output tube of the plastic extrusion module heats and melts the waste plastic, then the plastic extrusion module delivers the waste plastic which is melt to a decomposition system;

wherein the decomposition system includes a reaction furnace, a primary combustion chamber assembly, a secondary combustion chamber assembly, a cooling module, an oil storage tank, and a carbon storage tank, wherein the reaction furnace includes multiple first delivery tubes defined therein and configured to heat the waste plastic which is melt, when the waste plastic which is melt is located inside the multiple first delivery tubes, the multiple first delivery tubes have no oxygen so as to heat and decompose the waste plastic which is melt, thus producing decomposed carbon and oil-gas mixed liquid in the reaction furnace; the decomposed carbon is delivered to the carbon storage tank by a second delivery tube; and the carbon storage tank has a water filtering module for separating the decomposed carbon from air; the oil-gas mixed liquid flows through the cooling module to produce decomposed oil and syngas, wherein the decomposed oil is delivered to the oil storage tank, and the syngas enters into the primary combustion chamber assembly to be burned so as to provide heat to the reaction furnace, and the reaction furnace produces smoked gases which are delivered into the secondary combustion chamber assembly; and a filtration system including a heat exchanger, a cooling device, and a cyclone separation module, wherein a heat source is guided into the heat exchanger from the reaction furnace, and the heat exchanger heats the secondary combustion chamber assembly; the cooling device is connected with the secondary combustion chamber assembly, and the smoked gases are guided into the cooling device to reduce a temperature of the smoked gases to 200° C., and the smoked gases are sprayed by alkali adding equipment so as to eliminate sulfur oxide ($SO_x$), and are fed into the cyclone separation module after the sulfur oxide ($SO_x$) is eliminated, wherein the cyclone separation module produces wind in a filtration space so as to conduct the smoked gases to a filter, and the filter filters particles of the smoked gases, then a chimney discharges the particles.

2. The multi-tube pyrolysis system as claimed in claim 1, wherein each of the multiple first delivery tubes is circular or oval, has a tube body and a spiral rod, wherein the spiral rod has a spiral portion and a cylindrical body which are accommodated in the tube body, and a tangent of the spiral portion is close to a bottom of the tube body, such that the oil-gas mixed liquid is pushed by the spiral portion, and the syngas flows in a channel between a top of the spiral portion and an inner wall of the tube body, thus separating the oil-gas mixed liquid and the syngas.

3. The multi-tube pyrolysis system as claimed in claim 1, wherein the secondary combustion chamber assembly supplies a heat source to the plastic extrusion module so that a temperature of the output tube of the plastic extrusion module is within 250° C. to 300° C. so as to preheat the waste plastic and to eliminate moisture of the waste plastic.

4. The multi-tube pyrolysis system as claimed in claim 1, wherein the output tube of the plastic extrusion module has an air orifice defined on a middle section thereof so as to discharge water vapor.

5. The multi-tube pyrolysis system as claimed in claim 1, wherein the reaction furnace is heated to 380° C. to 500° C., and the multiple first delivery tubes are arranged in the reaction furnace and communicate with one another, wherein each of the multiple first delivery tubes has a spiral rod, and a temperature of each first delivery tube in anaerobic state is 380° C. to 500° C.

6. The multi-tube pyrolysis system as claimed in claim 1, wherein the decomposed carbon in the multiple first delivery tubes is cooled to a room temperature and to contact the air, and distal ends of the multiple first delivery tubes are then socked into water respectively so as to avoid the air flowing into the multiple first delivery tubes.

7. The multi-tube pyrolysis system as claimed in claim 1, wherein the cooling module is controlled less than 36° C. so that the syngas is washed by water or lye in a gas buffer tank, and the syngas is fed into the primary combustion chamber assembly to be burned in 1000° C., then a wind feeder delivers a heat of 1000° C. to the reaction furnace, thus heating the multiple first delivery tubes.

8. A method of operating the multi-tube pyrolysis system of claim 1 comprising steps of:

(S1) heating and melting the waste plastic, wherein the preparation system is configured to pick up the non-plastic substances in any one of a manual inspection manner, a magnet attraction manner, and a mechanical inspection manner, wherein the waste plastic is crushed by the crushing module, an aqueous solution is adjusted to a desired proportion by adding barium sulfate, calcium chloride or sodium carbonate so that polyethylene (PE), polypropylene (PP), and polystyrene (PS) float to the aqueous solution, and polyvinyl chloride (PVC) is deposited; the waste plastic is delivered to the plastic extrusion module so as to be heated and melted after being crushed by the crushing module;

(S2) decomposing the waste plastic, wherein the waste plastic which is melt is fed into the reaction furnace so as to be heated and decomposed, and the oil-gas mixed liquid is produced and flows through the cooling module to produce decomposed oil and syngas, wherein the decomposed oil is delivered to the oil storage tank, and the syngas enters into the primary combustion chamber assembly to be burned so as to provide heat to the reaction furnace; and (S3) discharging and filtering, wherein the filter filters the particles of the smoked gases, and the chimney discharges the particles.

* * * * *